Oct. 13, 1959  L. S. HAMER  2,908,480
PRESSURE RELIEVED VALVE SEAL
Filed Jan. 31, 1955
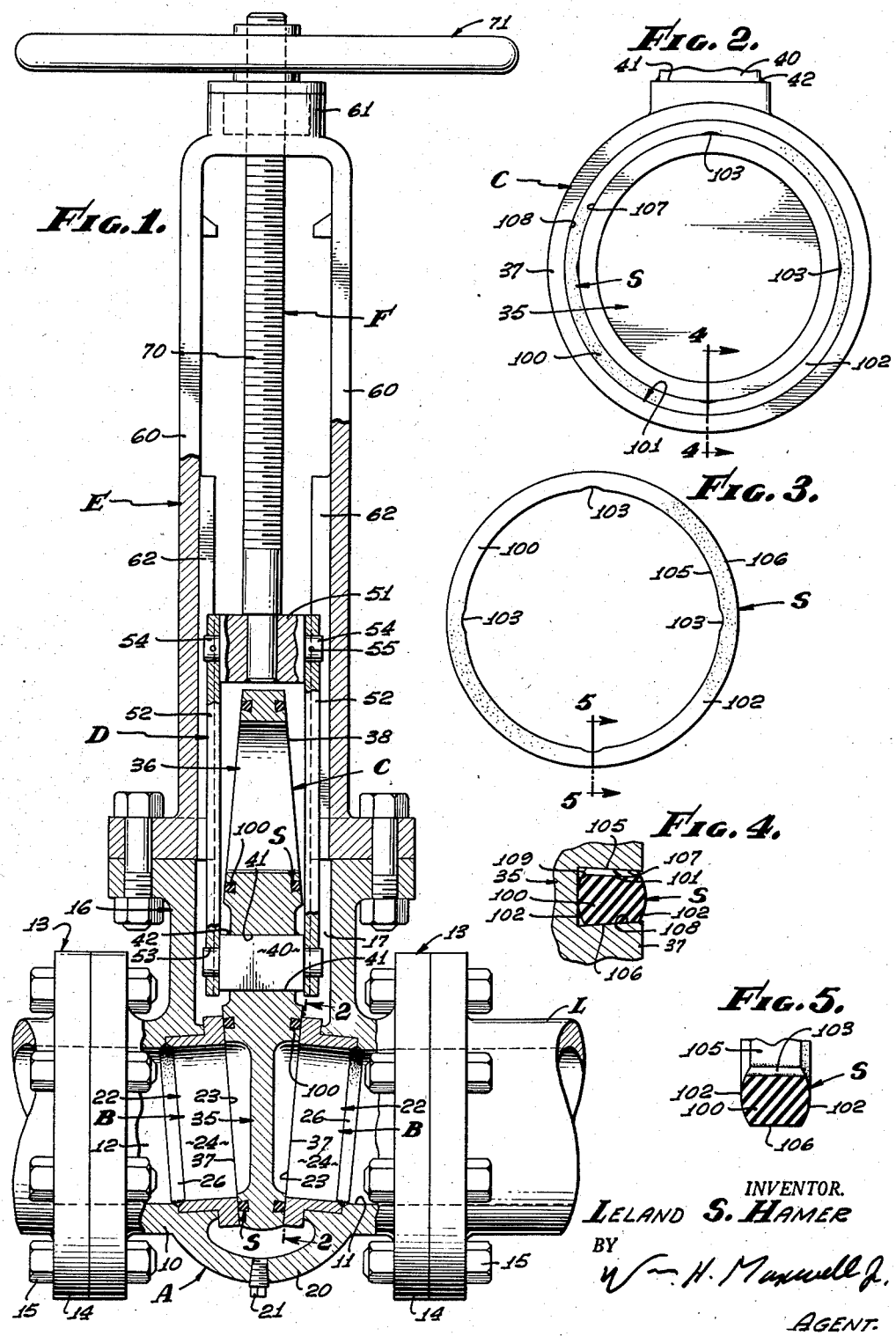
INVENTOR.
LELAND S. HAMER
BY
Wm. H. Maxwell Jr.
AGENT.

United States Patent Office 2,908,480
Patented Oct. 13, 1959

2,908,480

PRESSURE RELIEVED VALVE SEAL

Leland S. Hamer, Long Beach, Calif., assignor to Chiksan Company, Brea, Calif., a corporation of California Application January 31, 1955, Serial No. 485,168

4 Claims. (Cl. 251—328)

This invention has to do with a pressure relieved valve seal and is particularly concerned with a seal that is adapted to prevent flow of fluid between cooperating valve elements of a visible wedge valve, and which is carried in a groove that is relieved of pressure when the valve elements are disengaged or when fluid pressure is released from the valve.

This application is co-pending with my application Serial No. 455,693 entitled, "Visible Wedge Valve" filed September 13, 1954.

The construction and operation of valve seals is not altogether perfected as is evidenced by the fact that seals must be continually replaced as the valves are used. This is particularly true of high pressure valve seals which break down or disintegrate for various reasons. For example, the material of the valve seal will be extruded into crevasses between the valve elements, and will be chafed as movement occurs between the valve elements. Further, a valve seal will even be cut, or portions thereof completely severed or sheared away due to the fact that the sealing part is positioned or acted upon to protrude into the path of a moving element of the valve to be damaged thereby.

It is a general object of this invention to provide a pressure relieved valve seal of the character referred to that does not protrude and is not acted upon to be protruded or extended to be engaged by moving parts of the valve to become damaged.

An object of this invention is to provide an efficient sealing construction of the character referred to adapted to have engagement with a part having a plain, flat sealing face and which is not damaged by movement of said part relative to the said seal.

Another object of this invention is to provide a seal as above referred to, with pressure sensing notches that act to prevent entrapment of fluid behind the seal which would otherwise act upon the seal to cause it to protrude from the valve element carrying the seal.

It is still another object of this invention to provide a seal of the character referred to and having the above mentioned features, which seal is inexpensive of manufacture, reliable in operation, easily installed and which is securely held in proper working position in a valve element.

The various objects and features of my invention will be fully understood from the following detailed description of a typical preferred form and application of my invention, throughout which description reference is made to the accompanying drawings, in which:

Fig. 1 is a vertical sectional view through a typical valve embodying the pressure relieved valve seal of the present invention. Fig. 2 is an end view of one of the valve elements taken as indicated by line 2—2 on Fig. 1, and showing the valve sealing ring that I have provided. Fig. 3 is an end view of the valve ring of the present invention removed from the valve element. Fig. 4 is an enlarged detailed sectional view taken as indicated by line 4—4 on Fig. 2, and Fig. 5 is an enlarged detailed sectional view through the sealing ring taken as indicated by the line 5—5 on Fig. 3.

The pressure relieved valve seal of the present invention is shown incorporated in a valve construction, such as is disclosed in the above mentioned co-pending application. The valve is adapted to be inserted in a pipe line L, or the like, and involves, generally, a body A with couplings adapted to secure the valve in the pipe line, seats B carried in the body, an elongate double-ended valve element C adapted to be engaged with the seats B to open or close the valve, a carriage D for shiftably and rotatably supporting the valve element C, guide means E for the carriage, and operating means F adapted to shift the carriage to raise and lower the valve element C into and out of cooperative engagement with the seats B.

The body A is adapted to be inserted in the pipe line L and is provided to handle flow of fluid to be controlled by the valve. The body A is characterized by an elongate tubular part 10 having a wall 11 forming a flow passage 12 that opens at the ends of the body. Couplings 13 are at the ends of the part 10 and may be in the form of flanges 14, or the like, provided with openings for receiving suitable fasteners, such as bolts 15, or the like. It is to be understood that the ends of the part 10 may be secured to the sections of the pipe line L in any suitable manner, as by welding.

The body A also involves an extension 16 that projects laterally from the part 10 midway between the ends thereof and forms a chamber 17 that intersects the passage 12. The extension 16 is vertically disposed and normal to the longitudinal axis of the body A and has longitudinally spaced end walls and laterally spaced side walls. As clearly shown in Fig. 1 of the drawings, the extension 16 opens upwardly and is closed at its lower side by a bottom wall 20 forming a pocket adapted to catch fluid. A suitable drain plug 21, or the like, is provided to open the bottom of the extension 16 for drainage when desired.

The seats B are provided in the body A to receive the valve element C hereinafter described, and each seat is preferably a unit 22 carried in the body A on an axis somewhat inclined to the central longitudinal axis of the body A. The units 22 are opposed to each other and are annular units having flat opposed angularly related seating faces 23. The seating faces 23 are upwardly and outwardly divergent as shown in Fig. 1 of the drawings. The units 22 are alike and each involves an annular insert 24 provided with a plain flat face 23. The insert 24 is carried in a bore in the body A and is secured to and sealed with the body A by means of a continuous seam of welding 26.

The valve element is an elongate part having a pair of like flow controlling wedges 35 and 36 adapted to be forced into tight seating and sealing engagement between the units 22. The wedges 35 and 36 are essentially alike and each is a flat tapered part having flat angularly related faces 37 and 38, respectively, that face in opposite directions longitudinally of the body A and which are adapted to have flat seating engagement with the faces 23. The faces 37 and 38 are outwardly convergent and may be circular in configuration, as shown in Fig. 2 of the drawings, and are connected together at their inner ends by pivoted coupler 40. The wedges 35 and 36 are preferably separate parts in order to simplify machining of the wedges, in which case the wedges have faces 41 engageable with the coupler 40. The wedges and coupler are fastened against separation by welding 42 that joins these parts as a single unit.

The carriage D is provided to shiftably and rotatably carry the wedges 35 and 36 of the valve element C into and out of the chamber 17 where the wedges cooperate with the units 22 to open or close the passage 12. As clearly shown in Fig. 1 of the drawings, the coupler 40 extends longitudinally of the body A on an axis spaced from the central axis of the body. The carriage D involves, generally, a head 51 positioned above the valve element C and arms 52 that depend from the head 51 and engage the coupler 40 to carry the valve element. As shown, there is a pair of like arms 52, one at each end of the valve element C and adjacent the faces thereof.

Aligned bearing openings 53 are provided at the lower ends of the arms to be engaged with aligned pins projecting from the coupler 40. The head 51 and arms 52 may be integral. However, they are shown as being formed separately, in which case the head is provided with a pair of trunnions 54 that are engaged by and carry the arms 52 so that the arms extend downwardly from the head. Cotters 55, or like pins, may be provided to secure the arms to the trunnions and pin. It will be apparent that the carriage D supports the valve element C so that it can be raised and lowered and so that it can be rotated end for end, depending upon which wedge is to be used.

The guide E is provided to restrict the carriage D to movement vertically of the structure and involves a pair of supports 60, a header 61 carried by the supports, and rails 62 adapted to cooperate with the carriage so that the carriage is held against rotation.

In order to raise and lower the carriage D and valve element C I have provided the operating means F which is adapted to apply the necessary force to adequately handle and move the valve element as required. As shown, the means F is a mechanical means and involves, generally, an operating stem 70 coupled to the head 51 as by welding, and a manually operable means 71 for shifting the stem 70 and adapted to force the valve element C into pressure engagement between the seat units 22.

The seal S that I have provided is a pressure relieved valve seal and is adapted to operate between a pair of valve elements, such as the valve element C and a seat B, hereinabove described, that is, to provide a seal between the engaged faces of the valve elements B and C. In accordance with the invention, the seal S may be carried by either of the valve elements B or C and, as shown, is preferably carried by the shiftable element C leaving the faces 23 of the seats B flat and plain. It is to be understood that the seal or seals S may be carried by the seats B leaving the faces 37 and 38 of the element C flat and plain, if so desired.

As clearly illustrated in Figs. 2 and 3 of the drawings, the seal S is formed of a ring 100 of material that is inserted in and carried by a groove or channel 101 formed in the valve element, for example, the valve element C. The seal S is preferably circular and surrounds the flow passage 12 that extends through the body A of the valve when the element C is in seating engagement with the seats B, and the seal carrying channels 101 are therefore concentric with the passage 12 when in said position. As shown, the seal S involves, generally, the ring 100, the retaining and carrying channel 101, sealing faces 102 on the sealing ring, and pressure relieving notches 103 formed in the valve sealing ring. The sealing ring 100 is retained and carried in the channel 101 so that the faces 102 have sealing engagement with the faces of the valve seats and in a manner that prevents extrusion of material forming the ring and extension or protrusion of the ring from the face of the valve element carrying said ring.

The ring 100 is formed of flexible material, preferably vulcanized rubber-like material of suitable hardness, and is adapted to substantially fill the cross sectional configuration of the channel 101. The particular ring illustrated is formed to provide end axial sealing engagement, in which case there are side walls 105 and 106 which I will term inner and outer side walls, respectively. The inner and outer side walls 105 and 106 are circular and concentric with the axis of the ring 100 making the ring 100 uniform in cross section. It is to be understood that, broadly considered, the seal S of the present invention can be formed to have peripheral sealing engagement if so desired. In which case, the walls 105 and 106 would be the end walls and in a plane normal to the axis of the ring 100.

The sealing faces 102 are formed on the ring 100 to provide sealing engagement with the two valve elements involved, and in the case illustrated are end faces disposed axially in a plane normal to the axis of the ring. As shown, the walls are straight or flat, and the sealing end faces 102 extend between the walls with the result that the ring 100 is substantially square or rectangular in cross section. In accordance with the present invention, the end faces are curved or convex so that each end of the ring 100 is rounded.

The retaining and carrying channel 101 is a continuous annular channel with side walls 107 and 108, and in the case illustrated, are inner and outer side walls, respectively. The channel 101 is also provided with a bottom wall 109, the top of the channel being open at the face of the valve element. As shown, the channel 101 is cut or formed in the face of the valve element carrying the sealing ring 100 and the walls 107 and 108 are undercut or converge toward the opening of the channel. In practice, the channel converges to a width somewhat less than the width of the ring 100, so that the ring is compressed to a degree whereby it is securely retained in the channel.

As clearly shown in Fig. 4 of the drawings, the ring 100 is of a length to project somewhat beyond the top of the channel 101 and face of the valve element carrying the sealing ring, so that the sealing face 102 engages both the bottom 109 and the face of the opposed valve element, for example, the face 23 of the valve seat B to be pressed when the valve elements are brought together. When the parts are thus in sealing engagement the sealing ring 100 substantially fills the channel 101.

It is a feature of the seal that means is provided for relieving fluid from the groove or channel 101, so that the fluid is passed to the exterior of the sealing ring 100 and valve element carrying the ring. In ordinary seals there is no provision for escape of fluid in the manner referred to resulting in the sealing ring being forced outwardly by fluid under pressure in the groove or channel, when the fluid pressure at and around the seal is neutralized. Such action results in the protruding of the seal member as above pointed out. As clearly shown in Figs. 3 and 5 of the drawings, the pressure relieving notches 103 provide means for allowing fluid under pressure to escape from behind the ring 100, so that fluid is not trapped between the ring 100 and the bottom 109 of the channel 101.

The notches 103 may be of any suitable form and shape, and are preferably simple arcuate cut-outs in one of the side walls of the sealing ring 100. One or more notches may be provided in a series around the ring and, in accordance with the invention, the notches 103 are provided at the pressure side of the sealing ring. In the case illustrated, the notches 103 are provided in the inner side wall 105 of the ring so that fluid will enter and leave the channel 101 through the notches 103 at any time in the operation of the seal whether or not the seal is under pressure from fluid retained thereby.

From the foregoing, it will be apparent that I have provided an extremely simple and inexpensive pressure relieved sealing means, which is particularly adapted to efficiently seal between two valve elements and which does not protrude from the valve element carrying the seal. Thus, the sealing ring that I have provided can not be engaged by the movable elements of the valve in a manner to become damaged thereby as by abrasion or by cutting action.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An annular resilient, fluid pressure sealing ring of the character referred to adapted to seal between a pair of opposing faces in a fluid handling structure and to be engaged in and carried by an annular groove in one of said faces, having flat parallel side walls, rounded sealing faces extending between the side walls and a notch in the ring entering one of the side walls to extend between the rounded faces.

2. An annular resilient, fluid pressure sealing ring of the character referred to adapted to seal between a pair of opposing faces in a fluid handling structure and to be engaged in and carried by an annular groove in one of said faces, having flat parallel side walls, rounded sealing faces extending between the side walls and a plurality of circumferentially spaced notches in the ring entering one of the side walls to extend between the rounded faces.

3. In combination, a fluid handling structure having a pair of elements having axially aligned fluid passage therein and flat opposing faces, an annular, axially opening groove in the face of one of the elements and surrounding the flow passage therein and having a flat bottom opposing the face on the other element, an annular resilient sealing ring having axially disposed inner and outer peripheral sides, rounded end sealing faces and radially inwardly opening axially disposed notches in the inner peripheral side, said ring engaged in the annular groove with one end sealing face engaging and sealing on the bottom of the groove and the other end face projecting from the groove and engaging and sealing on the opposing face of the other element.

4. In combination, a fluid handling structure having a pair of elements having axially aligned fluid passages therein and flat opposing faces, an annular, axially opening groove in the face of one of the elements and surrounding the flow passage therein and having axially outwardly convergent sides and a flat bottom opposing the face on the other element, an annular resilient sealing ring having axially disposed inner and outer peripheral sides, rounded end sealing faces and radially inwardly opening axially disposed notches in the inner peripheral side, said ring engaged in the annular groove in pressure engagement between said outwardly convergent sides of the groove and maintained engaged in the groove thereby with one end sealing face engaging and sealing on the bottom of the groove and the other end face projecting from the groove and engaging and sealing on the opposing face of the other element, said notches in the ring establishing open communication between the interior and exterior of the groove about the inner periphery of the ring.

References Cited in the file of this patent

UNITED STATES PATENTS

| | | |
|---|---|---|
| 2,389,824 | Smith | Nov. 27, 1945 |
| 2,401,377 | Smith | June 4, 1946 |
| 2,474,132 | Vernet | June 21, 1949 |
| 2,587,091 | Barnes et al. | Feb. 26, 1952 |
| 2,655,936 | Wexler | Oct. 20, 1953 |
| 2,701,117 | Bashark | Feb. 1, 1955 |

FOREIGN PATENTS

| | | |
|---|---|---|
| 349,813 | Great Britain | of 1931 |
| 976,026 | France | of 1951 |